US012774399B2

(12) United States Patent
Nelson

(10) Patent No.: US 12,774,399 B2
(45) Date of Patent: Oct. 27, 2026

(54) SEAL COATS, ROAD SLURRIES, AND ASPHALT CRACK FILLERS AND SEALANTS

(71) Applicant: Meister SealCoat & Supplies, LLC, Santa Ana, CA (US)

(72) Inventor: Jeffrey Nelson, Perris, CA (US)

(73) Assignee: Meister SealCoat & Supplies, LLC, Santa Ana, CA (US)

( * ) Notice: Subject to any disclaimer, the term of this patent is extended or adjusted under 35 U.S.C. 154(b) by 365 days.

(21) Appl. No.: 18/633,400

(22) Filed: Apr. 11, 2024

(65) Prior Publication Data

US 2025/0320380 A1 Oct. 16, 2025

(51) Int. Cl.

| | |
|---|---|
| ***C09D 195/00*** | (2006.01) |
| ***C09D 5/02*** | (2006.01) |
| ***C09D 7/40*** | (2018.01) |
| ***C09D 7/61*** | (2018.01) |
| ***C09D 7/65*** | (2018.01) |

(52) U.S. Cl.

CPC ......... *C09D 195/005* (2013.01); *C09D 5/022* (2013.01); *C09D 5/028* (2013.01); *C09D 7/61* (2018.01); *C09D 7/65* (2018.01); *C09D 7/70* (2018.01)

(58) Field of Classification Search

CPC .... C09D 195/005; C09D 5/022; C09D 5/028; C09D 7/61; C09D 7/65; C09D 7/70; C08L 95/005

See application file for complete search history.

(56) References Cited

U.S. PATENT DOCUMENTS

2011/0155019 A1* 6/2011 Albright ................ C09D 5/028 106/675

OTHER PUBLICATIONS

Hu 0301006A2 (Year: 2003).*

* cited by examiner

*Primary Examiner* — Pamela H Weiss
(74) *Attorney, Agent, or Firm* — Lathrop GPM LLP

(57) ABSTRACT

Asphalt seal coats which contain fiberglass. The fiberglass can be Assembled Roving, Direct Roving, Dry Chopped Strands, Wet Chopped Strands, Woven Roving, Powder Chopped Strand Mat. Road slurries which contain fiberglass. The addition of fiberglass makes the products more durable and provides a non-slip surface.

2 Claims, No Drawings

SEAL COATS, ROAD SLURRIES, AND ASPHALT CRACK FILLERS AND SEALANTS

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure relates generally to improved asphalt seal coats, road slurries, asphalt crack fillers, and methods of making them, and more particularly to asphalt seal coats, road slurries, and asphalt crack sealers containing fiberglass.

In general, asphalt seal coats are protective layers applied to asphalt surfaces to keep out water, chemicals, and otherwise prevent damage to the asphalt surface. Seal coats can act as a filler to small cracks within the underlying pavement. Seal coats can also provide a more uniform surface, which can help in eliminating uneven wear. Road slurries are another product utilized in protecting and extending the life of asphalt surfaces. Slurries are a cold mix paving system comprised of aggregate, asphalt emulsion, and fillers.

Fiberglass has been known to be added to concrete materials to increase strength. However, fiberglass has never previously been introduced into asphalt seal coats, road slurries, or asphalt crack fillers/sealants.

It has been discovered by the inventors that by adding fiberglass to seal coats, road slurries, and asphalt crack fillers/sealants, one is able to provide a significantly improved product that adds durability to the product, along with providing a non-slip surface.

BRIEF SUMMARY

In accordance with one embodiment of the present disclosure, there is contemplated an asphalt seal coat having fiberglass added to the seal coat. The fiberglass may be dry chopped strands. The fiberglass may be cellulose microcrystalline.

The asphalt seal coat may include a coloring. In particular, the color may be, for example, and not intended to be limiting, black, gray, or brick red.

In one particular embodiment, the asphalt seal coat may be a mixture of 10.00%-17.08% by weight water, 30.00%-44.85% by weight sealer base emulsion, 1.80%-2.34% by weight coloring, 1.00%-2.00% by weight anhydrous calcium chloride, 2.00%-3.00% by weight attapulgite, 1.00%-2.00% by weight cellulose fiber, 28.00%-35.15% by weight slate, 1.50%-3.50% by weight preservative, and 2.50%-5.50% by weight of glass fiber. The glass fiber may be Assembled Roving, Direct Roving, Dry Chopped Strands, Wet Chopped Strands, Woven Roving, Powder Chopped Strand Mat, Emulsion Chopped Strand Mat, Glass fiber stitched fabrics, Glass fiber wet-laid mat.

In accordance with another embodiment of the present disclosure, there is contemplated an asphalt road slurry having fiberglass added to the road slurry. The fiberglass may be dry chopped strands. The fiberglass may be cellulose microcrystalline. The fiberglass may be Assembled Roving, Direct Roving, Dry Chopped Strands, Wet Chopped Strands, Woven Roving, Powder Chopped Strand Mat, Emulsion Chopped Strand Mat, Glass fiber stitched fabrics, Glass fiber wet-laid mat.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

As described herein typical asphalt seal coats, road slurries, and crack sealants, collectively described as "asphalt material(s)", can be unexpectedly improved with the addition of fiber glass to the asphalt material. In particular, the fiber glass envisioned for use is an Assembled Roving, Direct Roving, Dry Chopped Strands, Wet Chopped Strands, Woven Roving, Powder Chopped Strand Mat, Emulsion Chopped Strand Mat, Glass Fiber Stitched Fabrics, Glass Fiber, Wet-Laid Mat, Glass Filament Yarn, hereinafter referred to as "fiber glass". This can be achieved either by adding the fiber glass at the time of formulating the asphalt materials and/or at the time of applying the asphalt materials to the surface. The addition of fiber glass to the asphalt materials provides a better skid and slip repentance and extends the life of the paving when it is applied to asphalt surface. Additionally, the asphalt material can be used as an inner layer between old and new asphalt overlays/patches so that the existing cracking does not extend to the new pavement.

A mixture of traditional asphalt seal coats, for example, GoldCoatHP #310 manufactured by Goldstar Asphalt Products of Perris, California and the fiber glass results in the improved benefits described herein. The fiber glass may be, for example, CAS 9004-34-6.

In particular, one improved seal coat contains a mixture of water, a sealer base emulsion, coloring, anhydrous calcium chloride, attapulgite, cellulose fiber, slate, a preservative, and the fiber glass described herein.

The sealer base emulsion may be a combination of asphalt, water, and bentonite. More particularly, the sealer base emulsion may be approximately 30% by weight to approximately 60% by weight of asphalt, approximately 30% by weight to approximately 60% by weight water, and approximately 1% by weight to approximately 5% by weight bentonite. Even more particularly, the sealer base emulsion may be HE127DS manufactured by Henry Company of El Segundo, California.

The coloring may be carbon black CAS 1333-86-4. More particularly, the coloring may be Midnight Black 11 produced by ChromaScape, Inc. of Twinsburg, Ohio.

The anhydrous calcium chloride may be Hi 94 produced by Hill Brothers Chemical Company of Brea, California.

The attapulgite may be Attagel® 30 produced by BASF of Charlotte, North Carolina.

The cellulose fiber may be an industrial cellulose fiber produced by J. Rettenmaier USA, LP of Schoolcraft, Michigan.

The slate may be a bulk slate produced by Industrial Mineral Company of Sacramento, California.

The preservative may be Mergal K14 produced by Troy Corporation of Florham Park, New Jersey.

The fiber glass may be a non alkali fiber glass. This fiber glass may be known under the tradenames of Spectra® or Dyneema®. More particularly, the fiber glass may be a fiber glass produced of UHMWPE (ultra-high-molecular-weight polyethylene) Fiber.

The asphalt materials may be produced by creating a mixture of approximately 10.00%-17.08% by weight of water with approximately 30.00%-44.85% by weight of sealer base emulsion, namely, HE127DS. The mixture further includes approximately 1.80%-2.34% by weight of coloring, namely, Midnight Black 11, along with approximately 1.00%-2.01% by weight of anhydrous calcium chloride, namely, Hi 94, approximately 2.00%-3.00% by weight of attapulgite, namely, Attagel® 30, approximately 1.00%-2.00% by weight of cellulose fiber, approximately 28.00%-35.15% by weight of slate, approximately 1.5%-3.5% by weight of preservative, namely, Mergal K14, and approximately 2.5%-5.5% by weight of fiber glass, namely, the Assembled Roving, Direct Roving, Dry Chopped Strands, Wet Chopped Strands, Woven Roving, Powder Chopped Strand Mat, Emulsion Chopped Strand Mat, Glass fiber stitched fabrics, Glass fiber wet-laid mat.

The above description is given by way of example, and not limitation. Given the above disclosure, one skilled in the art could devise variations that are within the scope and spirit of the invention disclosed herein, including increasing or decreasing the amount of various components per standard engineering practices. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An asphalt seal coat comprising:

10.00%-17.08% by weight water;

30.00%-44.85% by weight sealer base emulsion;

1.80%-2.34% by weight coloring;

1.00%-2.00% by weight anhydrous calcium chloride;

2.00%-3.00% by weight attapulgite;

1.00%-2.00% by weight cellulose fiber;

28.00%-35.15% by weight slate;

1.50%-3.50% by weight preservative; and 2.50%-5.50% by weight of glass fiber.

2. The asphalt seal coat of claim 1, wherein the glass fiber is Assembled Roving, Direct Roving, Dry Chopped Strands, Wet Chopped Strands, Woven Roving, Powder Chopped Strand Mat, Emulsion Chopped Strand Mat, Glass fiber stitched fabrics, Glass fiber wet-laid mat.

* * * * *